(12) United States Patent
Farkas

(10) Patent No.: US 12,567,768 B2
(45) Date of Patent: Mar. 3, 2026

(54) WIRELESS CHARGING SYSTEM AND METHOD

(71) Applicant: CHAIRGE LLC, Wilmington, DE (US)

(72) Inventor: Alexander T. Farkas, Chatham, MA (US)

(73) Assignee: CHAIRGE LLC, Wilmington, DE (US)

( * ) Notice: Subject to any disclaimer, the term of this patent is extended or adjusted under 35 U.S.C. 154(b) by 596 days.

(21) Appl. No.: 18/113,360

(22) Filed: Feb. 23, 2023

(65) Prior Publication Data

US 2023/0275467 A1     Aug. 31, 2023

Related U.S. Application Data

(60) Provisional application No. 63/313,997, filed on Feb. 25, 2022.

(51) Int. Cl.
| | |
|---|---|
| *H02J 7/00* | (2006.01) |
| *H01P 3/12* | (2006.01) |
| *H01P 5/00* | (2006.01) |
| *H02J 50/00* | (2016.01) |
| *H02J 50/20* | (2016.01) |

(Continued)

(52) U.S. Cl.
CPC ................ *H02J 50/20* (2016.02); *H01P 3/12* (2013.01); *H01P 5/00* (2013.01); *H02J 7/0048* (2020.01); *H02J 50/005* (2020.01); *H02J 50/80* (2016.02); *H02J 50/90* (2016.02); *H02J 50/70* (2016.02)

(58) Field of Classification Search
USPC .......................... 320/106, 107, 108, 109, 110
See application file for complete search history.

(56) References Cited

U.S. PATENT DOCUMENTS

| | | | |
|---|---|---|---|
| 6,220,516 | B1 | 4/2001 | Tuttle et al. |
| 8,981,714 | B2 | 3/2015 | Miller et al. |

(Continued)

OTHER PUBLICATIONS

International Preliminary Report on Patentability and Written Opinion from PCT Application No. PCT/US2023/013693 dated Sep. 6, 2024, 8 pages.

(Continued)

*Primary Examiner* — Brian Ngo
(74) *Attorney, Agent, or Firm* — Cozen O'Connor

(57) ABSTRACT

A wireless charging system includes a hollow electromagnetic waveguide and a platform that, when placed inside the waveguide, positions one or more wireless devices to absorb energy from an electromagnetic field propagating along the waveguide. The system also includes first and second couplers located near opposite ends of the waveguide. The first coupler, when driven with an electrical signal, couples energy from the electrical signal into the electromagnetic field. At the same time, the second coupler couples energy from the electromagnetic field into an electrical receiving signal. The second coupler may be connected to a dissipative load to dissipate the energy of the electrical receiving signal. Alternatively, the electrical receiving signal can be processed to power the wireless charging system. The wireless charging system charges the wireless devices with high efficiency regardless of their positions inside the waveguide, thereby ensuring that the wireless devices charge at a similar rate.

21 Claims, 8 Drawing Sheets

(51) Int. Cl.

| | | |
|---|---|---|
| *H02J 50/80* | (2016.01) | |
| *H02J 50/90* | (2016.01) | |
| *H02J 50/70* | (2016.01) | |

(56) References Cited

U.S. PATENT DOCUMENTS

| | | | |
|---|---|---|---|
| 9,312,924 B2 | 4/2016 | Ozaki et al. | |
| 2003/0210203 A1 | 11/2003 | Phillips et al. | |
| 2006/0234787 A1 | 10/2006 | Lee et al. | |
| 2007/0063914 A1 | 3/2007 | Becker | |
| 2010/0080151 A1* | 4/2010 | Proctor, Jr. | H01Q 1/38 |
| | | | 370/279 |
| 2010/0289341 A1 | 11/2010 | Ozaki et al. | |
| 2011/0187326 A1 | 8/2011 | Yamazaki et al. | |
| 2013/0241468 A1 | 9/2013 | Moshfeghi | |
| 2015/0077053 A1* | 3/2015 | Stamenic | H02J 7/00302 |
| | | | 320/109 |
| 2015/0171658 A1 | 6/2015 | Manova-Elssibony et al. | |
| 2015/0197155 A1* | 7/2015 | Lu | B60L 53/12 |
| | | | 320/108 |
| 2016/0064794 A1 | 3/2016 | Henry et al. | |
| 2016/0241077 A1 | 8/2016 | Lee et al. | |
| 2016/0372948 A1 | 12/2016 | Kvols | |
| 2017/0187229 A1 | 6/2017 | Hosseini | |
| 2021/0021154 A1 | 1/2021 | Gossling | |
| 2021/0143681 A1 | 5/2021 | Farkas | |
| 2022/0158361 A1* | 5/2022 | Kim | H01Q 9/0407 |

OTHER PUBLICATIONS

International Search Report and Written Opinion of the International Searching Authority for International Patent Application No. PCT/US2023/013693 mailed Jun. 1, 2023, 9 pages.
Non-Final Office Action for U.S. Appl. No. 17/091,332 mailed Mar. 31, 2022, 15 pages.
International Search Report and Written Opinion of the International Searching Authority for International Patent Application No. PCT/US2020/059354 mailed Mar. 30, 2021, 14 pages.

* cited by examiner

120

202

206(1)

206(2)

CHARGING CIRCUIT 204

RECTIFIER 208

OPERATIONAL CIRCUIT 220

CHARGEABLE BATTERY 210

WIRELESS CHARGING SYSTEM AND METHOD

RELATED APPLICATIONS

This application claims priority to U.S. Provisional Patent Application No. 63/313,997, filed on Feb. 25, 2022, the entirety of which is incorporated herein by reference.

BACKGROUND

Capacitive and inductive coupling are two techniques for wireless power transfer (WPT) that may be used to charge a battery in a hermetically sealed electrical device without electrical contact (e.g., via wire or electrically conductive contacts). With these techniques, a time-varying electromagnetic field generated by a charger penetrates a hermetic barrier that encapsulates and seals the electrical device. The energy of the electromagnetic field is received by the electrical device to produce an alternating, or AC, current that can be rectified into a direct, or DC, current for charging the battery.

SUMMARY

The present embodiments include a wireless charging system and method that implement wireless power transfer (WPT) to concurrently charge a plurality of wireless devices within a shielded chamber acting as a hollow electromagnetic waveguide. Advantageously, the wireless devices are charged with high efficiency regardless of their longitudinal positions inside the chamber, thereby ensuring that all the wireless devices charge at a similar rate. The hollow electromagnetic waveguide is built as symmetrical chamber in which pairs of identical transceiver antennas are disposed on opposite ends of each symmetrical section of the chamber. Each antenna pair is set to operate in a complementary mode such that when one antenna of the pair emits electromagnetic power into the waveguide, the other antenna of the pair receives electromagnetic power from the waveguide. These antennas excite one or more waveguide modes of the waveguide. For clarity, these antennas are also referred to herein as couplers since it is their near-field emissions, as opposed to their far-field radiation, that couple to the waveguide modes.

Switching circuitry is added to swap the functionalities of the two antennas within a complementary pair. This advantageously improves the spatial uniformity of the time-averaged power distribution within the waveguide. The antenna pairs are symmetrically placed inside and towards opposite ends of the hollow waveguide. For a given switching configuration, the first antenna emits an electromagnetic field that is received by each of the wireless devices. Each wireless device may include a whisker antenna that receives a portion of the electromagnetic field as an alternating, or AC, current, and a rectifier that converts the AC current into a direct, or DC, current that may be used to charge a rechargeable battery, or other energy-storage component, within the wireless device.

Radiated power that is emitted from one antenna and not absorbed (e.g., by any wireless device or the waveguide itself) is then converted by the second antenna into an electrical signal. This electrical signal may then be conducted to a dissipative load that dissipates the energy. Alternatively, this electrical signal may be rectified into a DC power signal that electrically powers the system. This alterative use of the electrical signal increases the wall-plug efficiency of the system.

DETAILED DESCRIPTION

Wireless Power Transfer in Free Space

Figure 1:
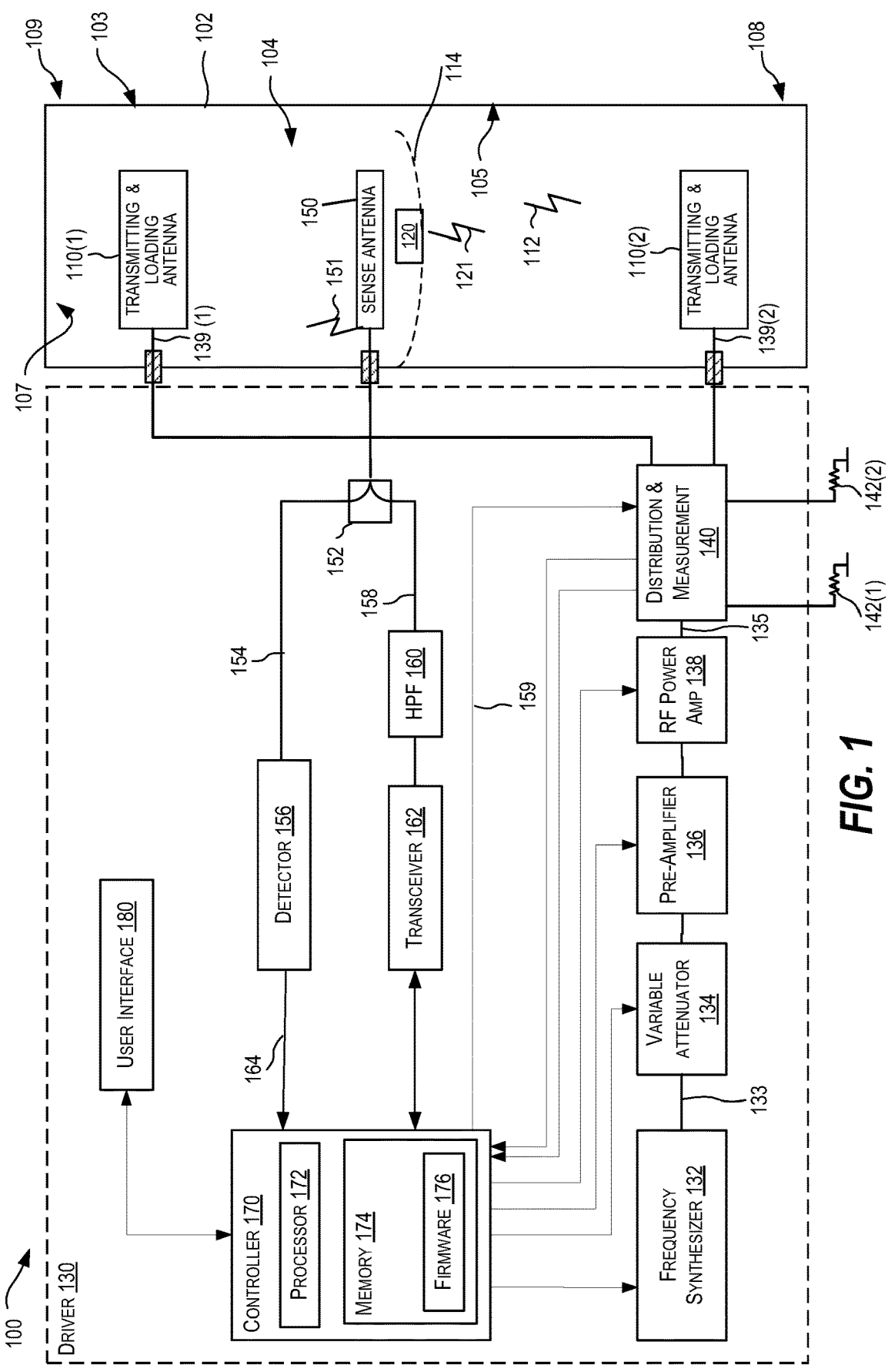
FIG. 1 is a functional diagram of a wireless charging system that simultaneously charges at least one wireless device, in embodiments.

The efficiency $\eta$ with which power can be wirelessly transferred from a charger to an electrical device depends on the distance d therebetween, among other variables. For example, in wireless power transfer (WPT) based on inductive coupling, the charger drives a first inductor to generate an oscillating magnetic field that induces an AC current in a second inductor located in the electrical device. The efficiency $\eta$ scales as the square of the mutual inductance $M_{12}$ between the two inductors. When the inductors are counterfacing co-axial circular loops with the same radius $r_0$, the mutual inductance $M_{12}$ can be expressed mathematically as $$M_{12} = \frac{\mu_0 \pi}{2} \frac{r_0^4}{\left(r_0^2 + d^2\right)^{3/2}}, \tag{1}$$

where $\mu_0$ is the permeability of free space. The efficiency $\eta$ is highest in the limit $d \ll r_0$. In this case, Taylor-expanding the square of the mutual inductance $M_{12}$ yields $$\eta = k r_0^2 \left(1 - \frac{3d^2}{r_0^2} + \ldots\right) \text{ for } d \ll r_0, \tag{2}$$

where k is a constant such that all values of $\eta$ lie between 0 (i.e., perfect inefficiency) and 1 (perfect efficiency). In Eqn. 2, the efficiency $\eta$ approaches 1 as the distance d approaches 0, reflecting the fact that as the electrical device is brought closer to the charger, more of the magnetic flux generated by the first inductor couples into the second inductor. In the opposite limit of $d \gg r_0$, the efficiency $\eta$ is approximated by $$\eta = k\frac{r_0^3}{d^6}\left(1 - \frac{3r_0^2}{d^2} + \dots\right) \text{ for } d \gg r_0, \tag{3}$$

where the dominant term, scaling as $1/d^6$, reflects the fact that when the electrical device is far from the charger, almost all the magnetic flux generated by the first inductor "misses" the second inductor. To ensure that the efficiency $\eta$ is large enough for WPT to be effective, the wireless device is usually placed closer than $r_0$ to the charger.

Similar equations can be derived for WPT based on capacitive coupling. In this case, the charger drives a first electrode to generate an oscillating electric field that induces the AC current in a second electrode in the electrical device. When the electrodes form a parallel-plate capacitor with plates having the same characteristic dimension $r_0$ and separated by a distance d, the efficiency $\eta$ approaches 1 in the limit of $d \ll r_0$. In this limit, essentially all the electric flux generated by the first plate couples to the second plate. In the opposite limit of $d \gg r_0$, the efficiency $\eta$ drops rapidly with the distance d as more of the electric flux "misses" the second electrode. Like inductive coupling, the wireless device is usually placed closer than $r_0$ to the charger to ensure that $\eta$ is large enough for WPT to be effective.

WPT may also be implemented via electromagnetic radiation emitted by a transmitting antenna in the charger, wherein the electrical device includes a receiving antenna that receives the electromagnetic radiation to generate the AC current. In this case, the efficiency $\eta$ is proportional to the time-averaged Poynting vector (i.e., the energy flux density, or energy transferred per unit time through a surface of unit area) of the electromagnetic radiation, which scales as $1/d^2$ (d being the distance between the two antennas) and thus follows the well-known inverse-square law. Although beamforming techniques may be used to increase power transmission by shaping the radiation as a beam, the energy flux density of the beam still decreases as $1/d^2$ according to the Rayleigh criterion.

Due to the $1/d^2$ scaling with distance, WPT based on electromagnetic radiation can be effectively implemented at larger distances between the charger and electrical device, as compared to inductive and capacitive coupling. For inductive coupling, this difference can be seen in Eqn. 3, where the dominant term scales as $1/d^6$, indicating that the reactive (i.e., non-radiative) near field generated by the first inductor is the primary vehicle for power transmission. Although not shown explicitly, the same is true for WPT based on capacitive coupling. Far-field electromagnetic radiation differs from these reactive near fields in that the far-field does not back-couple to the transmitter (i.e., the first inductor, the first cathode, or the transmitting antenna) to distort the electromagnetic field.

In the above example of inductive coupling, the first inductor can be resonantly driven to generate the far-field electromagnetic radiation in addition to the near field. That is, the first inductor can act as a loop antenna, and thus serve as the transmitting antenna for WPT based on electromagnetic radiation. In the electrical device, the second inductor may serve as the receiving antenna that receives the electromagnetic radiation. The first inductor may alternatively be driven non-resonantly to minimize the electromagnetic radiation. For capacitive coupling, the first electrode can be driven resonantly to generate the far-field electromagnetic radiation, and thus can serve as the transmitting antenna. Similarly, the second electrode may serve as the receiving antenna that receives the electromagnetic radiation.

As will be appreciated by those trained in the art, the difference between the terms "near field" and "far field" is not clearly delineated and depends on context. The transition between these two regions may be defined as a boundary occurring as close as $\lambda/(2\pi)$ to, and as far as $2\lambda$-$3\lambda$ from, the transmitting antenna. In other cases, the transition is defined as a zone typically located $1\lambda$-$2\lambda$ away from the transmitting antenna. The near-field region may also be divided into a reactive near-field region that is closer to the transmitting antenna than a radiative near-field region. The radiative near-field region is "radiative" in the sense that the fields therein are sufficiently out-of-phase with an oscillating signal driving the transmitting antenna that reactive energy stored in the fields cannot return to the transmitting antenna, and "near-field" in the sense that the electric and magnetic components of the fields therein are still not in-phase, as is the case for far-field electromagnetic radiation.

Wireless Power Transfer with Hollow Electromagnetic Waveguides

The present embodiments include a wireless charging system and method that improve WPT charging of multiple wireless devices via electromagnetic radiation. The wireless devices are placed inside a shielded chamber that acts as a hollow waveguide to confine and guide electromagnetic fields therein. For clarity in the following discussion, the shielded chamber is a square cuboid; however, the shielded chamber may have a differently shaped cross-section (e.g., oval, circular, rectangular, etc.) without departing from the scope hereof. The square cuboid shielded chamber forms a hollow waveguide with a square cross-section of length a in both the transverse x and y directions. That is, the waveguide is defined by the intersection of a first side wall lying at x=0, a second side wall lying at x=a, a third side wall lying at y=0, and a fourth side wall lying at y=a. The waveguide may be driven (i.e., with an appropriate frequency and polarization) such that only the lowest-frequency transverse-electric (TE) mode of the waveguide, also known as the $TE_{10}$ mode, is excited. In this case, the energy flux density along the longitudinal z direction is given by the Poynting vector $$P_Z(x) = \frac{1}{\eta_{TE}}|E_0|^2\sin^2\left(\frac{\pi x}{a}\right), \tag{4}$$

where $E_0$ is the amplitude of the transverse electric field, $\eta_{TE}$ is the transverse wave impedance of the electromagnetic field in the $TE_{10}$ mode. From Eqn. 4, the power available for a wireless device goes to zero near the first and second side walls, and thus the wireless devices should not be placed too close to these side walls. Nevertheless, at the center of the waveguide, where Eqn. 4 has a maximum, the Poynting vector varies sufficiently slowly with x that multiple wireless devices can be placed in this region and have similar power transfer efficiencies. Although the waveguide may be driven to excite higher transverse modes, the Poynting vectors for these higher modes have more peaks and valleys that reduce spatial uniformity in the transverse directions. The waveguide may also be driven to be overmoded (i.e., simultaneously exciting several modes) to improve spatial uniformity.

To further enhance spatial uniformity of the Poynting vector throughout the chamber, the wireless charging system may include an absorptive second end wall, opposite the first end wall, of the chamber. The second end wall may be a lid that can be opened to facilitate entry of wireless devices into the chamber, and removal therefrom. The absorptive second end wall acts as a termination for the waveguide. Specifically, the reflection coefficient ρ and transmission coefficient T at the boundary between the chamber and end wall (see inner-facing surface 107 in FIG. 1) can be expressed mathematically as:

$$\rho = \frac{\eta_2 - \eta_1}{\eta_2 + \eta_1} \tag{5}$$

$$\tau = \frac{2\eta_2}{\eta_2 + \eta_1},$$

where $\eta_1$ and $\eta_2$ are the impedances of the waveguide (e.g., see $\eta_{TE}$ in Eqn. 4) and the absorptive second end wall, respectively. From Eqn. 5, there is no reflection if impedances $\eta_1$ and $\eta_2$ are equal. The fraction of the incident power density reflected is $|\rho|^2$ and the fraction of the incident power density transmitted into the second end wall is $1-|\rho|^2$.

Advantageously, the absorptive second end wall prevents longitudinal standing waves from arising in the chamber. Due to their nodes and antinodes, longitudinal standing waves cause longitudinal variations in energy flux density, thereby causing the charging efficiency to become dependent on the positions of the wireless devices. With the absorptive second end wall, the electromagnetic field propagates longitudinally through the chamber as a traveling wave without nodes and antinodes, thereby ensuring spatial uniformity of the Poynting vector in the longitudinal direction.

Alternatively, the absorptive second end wall may be replaced with a second antenna that is similar to the first antenna and can be used to absorb the radiated energy. The combination of the drive antenna some distance from the closed, conductive floor also approximates an open end. By adding the exact same transmitting antenna where the absorptive second end wall was, knowing that any antenna is a bidirectional structure, left-over electromagnetic energy (i.e., electromagnetic energy not absorbed by any of the wireless devices) could be coupled into that antenna and dissipated outside the tank in a standard low-cost termination. This also has the advantage of being easier, cheaper, lighter in weight and more flexible to manufacture and customize.

To further reduce the occurrence of longitudinal modes, the length of the chamber in the longitudinal direction (i.e., the distance between the first and second end walls) may be comparable to, or less than, one-half the wavelength λ of the electromagnetic field. In addition, the absorptive second end wall may be textured so that the unabsorbed portion of the electromagnetic field, when impinging on the absorptive second end wall, scatters in various directions and is thus less likely to excite a longitudinal mode.

The side walls and end walls of the chamber may be made from metal, such as copper foil, sheet, or plate. The metal should have a thickness of several skin depths to minimize penetration of the electromagnetic field through the walls. Advantageously, the walls prevent electromagnetic energy from leaking out of the chamber, where it could potentially interfere with other electrical devices or cause a health hazard. Thus, the antenna inside the chamber can be driven with high power (e.g., up to 20 W, or more), to charge the wireless devices faster, while ensuring that the surrounding area is safe.

A Wireless Charging System for Multiple Wireless Devices

Figure 2:
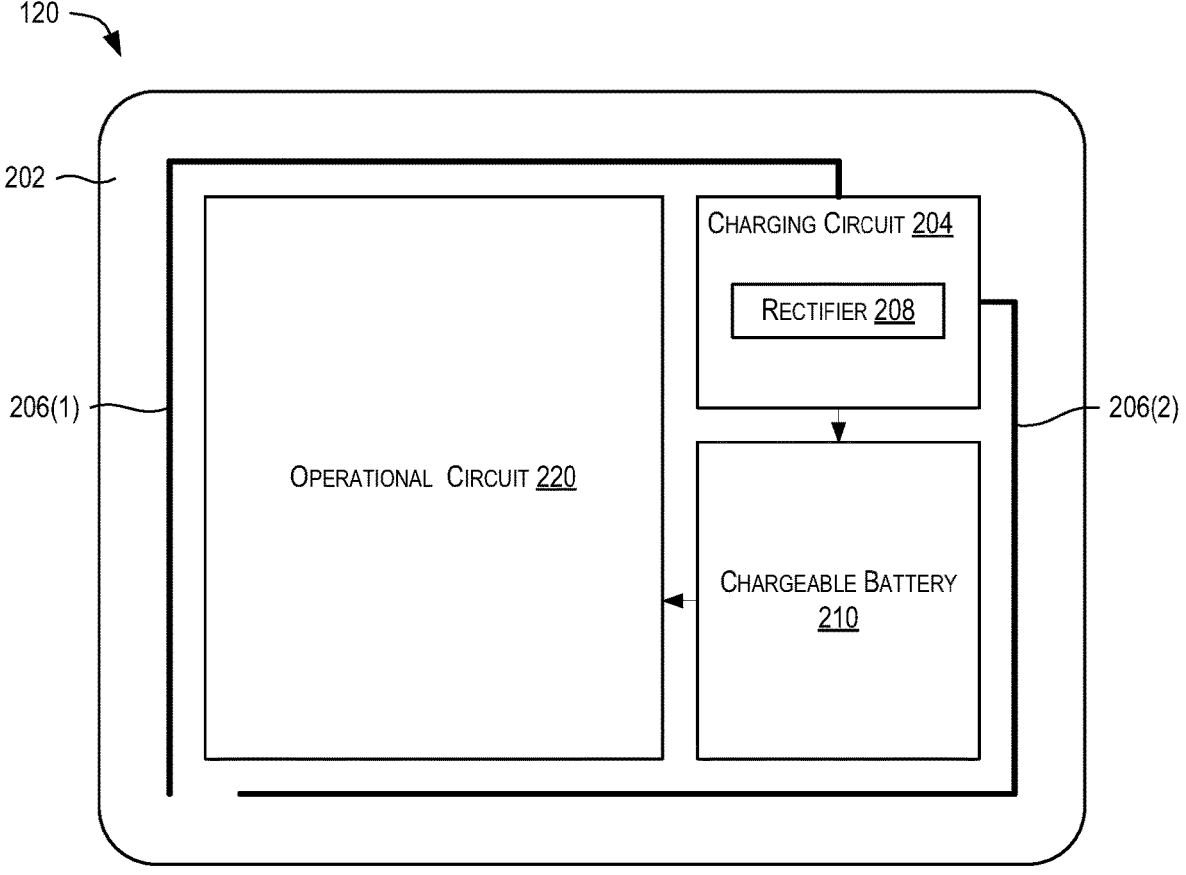
FIG. 2 shows one example of the wireless device of FIG. 1.
Figure 3A:
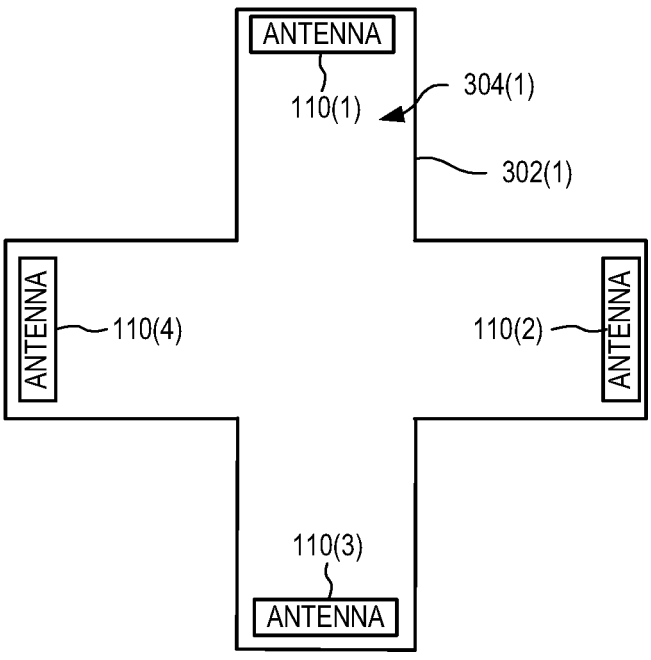
FIG. 3A shows a symmetrical two-way waveguide configuration, in an embodiment.
Figure 3B:
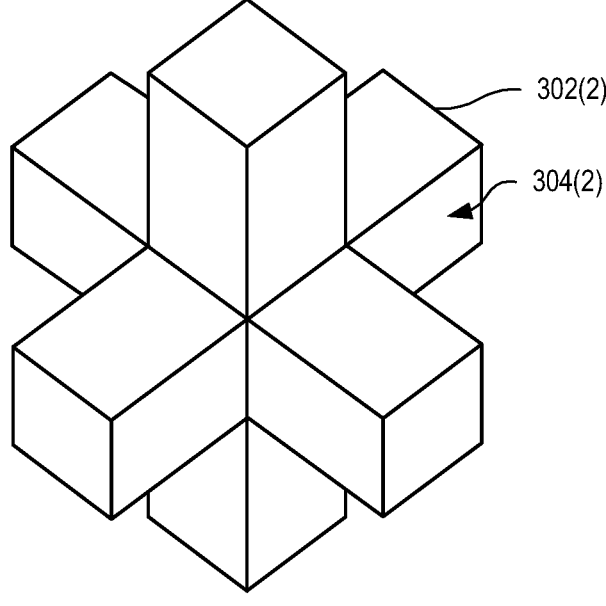
FIG. 3B shows a symmetrical three-way waveguide configuration, in an embodiment.
Figure 4:
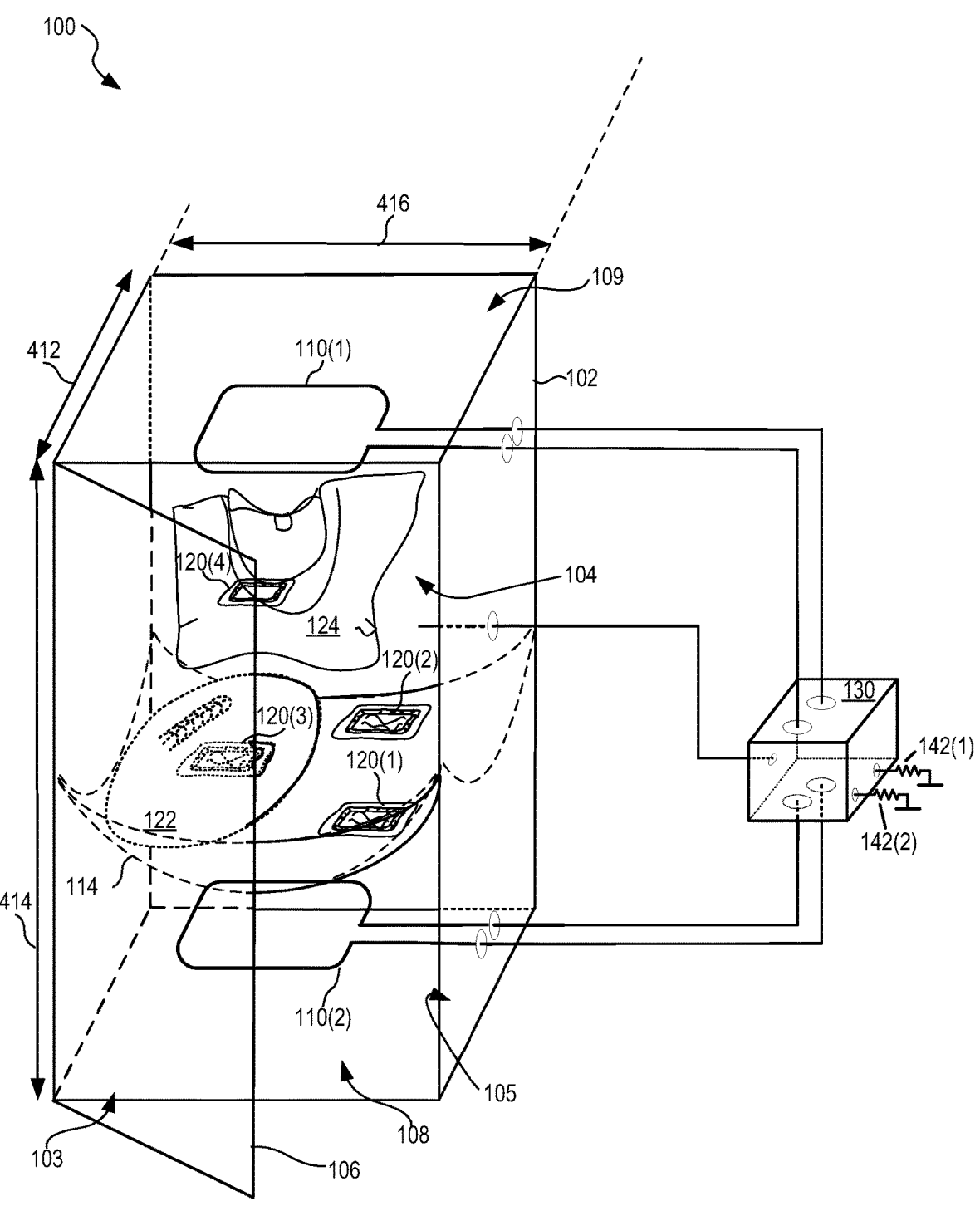
FIG. 4 is a perspective view of the wireless charging system of FIG. 1, in embodiments.

FIG. 1 is a functional diagram of a wireless charging system 100 that can simultaneously charge at least one wireless device 120. FIG. 2 is a schematic diagram showing one example of wireless device 120 of FIG. 1. FIGS. 3A and 3B show examples of symmetrical wireless charging chamber structure variations. FIG. 4 is a perspective view of wireless charging system 100 of FIG. 1. FIGS. 1-4 are best viewed together with the following description.

Wireless device 120 is any type of device that can be charged via WPT techniques. For example, wireless device 120 may be a wireless tracking tag, such as those used for tracking athletes and equipment (e.g., balls) during a sporting event (e.g., American football, soccer, hockey, etc.). Alternatively, wireless device 120 is used to track a non-athlete human, a non-human animal, or an inanimate object (e.g., a package, a product in a warehouse, a vehicle, etc.). In the shown example, wireless device 120 has a flexible protective outer material 202 that encloses and hermetically seals an operational circuit 220, a charging circuit 204, a chargeable battery 210, and one or more whisker antennas 206. When hermetically sealed, wireless device 120 has no external electrical connections or contacts. Battery 210 represents one or more of a rechargeable battery (e.g., lithium-ion battery, lead-acid battery, nickel-cadmium battery, etc.), a capacitor, a supercapacitor, and any other type of electrical energy-storage component. Operational circuit 220, when powered by battery 210, implements functionality of wireless device 120 (e.g., athlete tracking, transmitting/receiving data, sensors, etc.). Charging circuit 204 and one or more whisker antennas 206 facilitate charging of battery 210 by wireless charging system 100. In certain embodiments, each whisker antenna 206 has a length less than one-half of a wavelength λ of an electromagnetic field 112 received by one or more whisker antennas 206. Each whisker antenna 206 receives electromagnetic field 112 as an AC current. Charging circuit 204 includes at least one rectifier 208 that converts the AC current into a DC current for charging battery 210.

Wireless device 120 may form a resonant structure with each of one or more whisker antennas 206 therein. For example, wireless device 120 may have an internal ground plane that cooperates with each whisker antenna 206 to form a resonant transducer, at a resonant frequency $f_r$, that maximizes power conversion from electromagnetic field 112 to the AC current. Charging circuit 204 may include one or more tuning components (e.g., inductors and capacitors) that tune the resonant frequency $f_r$ to coincide with the frequency f of electromagnetic field 112. Accordingly, a length of each whisker antenna 206 may be selected for convenience (e.g., based on a size of wireless device 120) or such that its resonant frequency coincides with f without any tuning components.

While FIG. 2 shows two whisker antennas 206(1) and 206(2), wireless device 120 may alternatively have more than two whisker antennas 206 without departing from the scope hereof. For example, wireless device 120 may include three whisker antennas. To increase polarization diversity, the three whisker antennas may be oriented such that they are mutually perpendicular to each other. While FIG. 2 shows each of whisker antennas 206(1) and 206(2) forming a right angle, each whisker antenna 206 may be alternatively shaped (e.g., curved, forming multiple bends, straight, etc.) without departing from the scope hereof.

Although not shown in FIG. 2, operational circuit 220 may include one or more communication antennas with which wireless device 120 wirelessly communicates (i.e., sending and receiving) with the system 100. These communication antennas are different from whisker antennas 206. The one or more communication antennas may be used for Wi-Fi (e.g., near 2.4 GHz or 5 GHz), Bluetooth, cellular communication, ultrawide-band communication (i.e., 3.1-

10.6 GHz), another type of wireless communication proto-col, or a combination thereof. In some embodiments, opera-tional circuit 220 implements wireless communication at frequencies away from the frequency f of electromagnetic field 112 (e.g., greater than f or less than f). This allows the system 100 to wirelessly communicate with wireless devices 120 by filtering any interference caused by the electromag-netic field 112 (see high-pass filter 160 in FIG. 1). In other embodiments, each wireless device 120 excludes commu-nication antennas. In these embodiments, it is not possible to wirelessly communicate with wireless devices 120.

Wireless charging system 100 includes a housing 102 that forms a chamber 104 for containing a plurality of wireless devices 120. In embodiments, chamber 104 has a door 106 at a side 103 to allow wireless devices 120 to be added to, and removed from, chamber 104 (see door 106 in FIG. 4). Door 106 fits into the opening at side 103 such that chamber 104 is bounded by six planar sides formed by housing 102 and door 106. Chamber 104 has a first side length 412, a second side length 416 similar to first side length 412, and a height 414. However, chamber 104 may have other sym-metrical cross-section shapes (e.g., rectangular, elliptical, circular, etc.) without departing from the scope hereof. All side surfaces 105 (e.g., four inside surfaces of housing 102) of chamber 104 are electrically conductive. For example, inner surfaces 105 may be formed from copper film or plate.

Two antennas 110 are disposed near a top end face 109 and a bottom end face 108 of the chamber 104 and are set to operate in a complementary mode such that if the antenna at one end emits the electromagnetic power to the devices, the antenna at the opposite end converts an unabsorbed portion of the electromagnetic power into an electrical signal that may be subsequently dissipated or recycled (e.g., rec-tified and regulated) to power the wireless charging system 100.

During charging of wireless devices 120, the antennas sequentially alternate their roles, i.e., the antenna that was transmitting power is switched to an external load 142, while the other antenna that previously has been loading the unused transmitted power is switched to a power source to emit charging power. A duration or a duty cycle of each event in the sequence can be either fixed or dynamically adjusted. Additionally, a level of the charging power can be adjusted in each event independently. Consequently, a com-bination of the aforementioned transmitting power param-eters advantageously enhances spatial uniformity of charg-ing power distribution within the chamber by time averaging the charging energy allocation.

Since the built-in symmetry of this WPT, a variety of symmetrical chamber structures 104 may be built. In certain embodiments, orthogonal symmetrical chamber structures can be constructed as shown in FIGS. 3A and 3B. FIG. 3A shows a two-way configuration that uses four antennas 110 (i.e., two pairs of antennas). FIG. 3B shows a three-way configuration that uses six antennas (not shown). Each antenna alternatives between receiving and transmitting. The two-way configuration has a double orthogonal sym-metric chamber while the three-way configuration has a triple orthogonal symmetric chamber. The use of orthogonal symmetrical chambers allows for more power to be radiated to the devices being charged so that they may charge faster. They can also improve spatial uniformity of the electromag-netic power density, thereby helping to eliminate "cold spots."

In other embodiments, the symmetrical chambers may be arranged in non-orthogonal configurations. The antennas 110 that, for a given instance, are in loading modes along with interconnected respective external loads, such as the units being charged, may be modeled as equivalents of a matching network and therefore various impedance configu-rations can be accommodated. The chambers shown and discussed may have a rectangular cross section, as shown in FIGS. 3A and 3B. However, the chambers may have a differently shaped cross section (e.g., oval, circular, rectan-gular, etc.) without departing from the scope hereof.

Wireless devices 120 may be placed within chamber 104 using a platform 114. In the example of FIG. 4, platform 114 is a mesh net that supports a first wireless device 120(1), a second wireless device 120(2), a third wireless device 120 (3) embedded in a football 122, and a fourth wireless device 120(4) embedded within a jersey 124. To prevent platform 114 from interfering with guiding of electromagnetic field 112, platform 114 is best constructed of a dielectric material that is non-absorptive at the frequency f of electromagnetic field 112. Platform 114 positions wireless devices 120, and any object within which wireless devices 120 are embedded, away from antennas 110 and towards the center of the chamber 104, so that wireless devices 120 do not couple with either emitted or loaded near fields by antennas 110, one being in transmission while the other in loading mode. Platform 114 may additionally position wireless devices 120 away from inner surfaces 105, where energy flux density is lowest (e.g., see Eqn. 4). While FIGS. 1 and 4 show platform 114 as being flexible, platform 114 may alternatively be rigid. Platform 114 may also be removable to facilitate entry of wireless devices 120 into chamber 104, and removal therefrom (i.e., when door 106 is open). For example, platform 114 may be a basket that holds wireless devices 120, and that may be inserted into, and removed from, chamber 104 via side opening 103. The basket may be rigid so that when it is inserted into chamber 104, the basket remains sufficiently far from either 110(1) or 110(2) anten-nas to ensure that wireless devices 120 (and the basket) do not couple with the near fields. Platform 114 may be any other physical structure that positions wireless devices 120 within chamber 104 (i.e., within the hollow electromagnetic waveguide formed by chamber 104).

Inner side surfaces 105 cooperate to form a hollow electromagnetic waveguide whose modes, when excited, support propagation of an electromagnetic field there-through. Specifically, electromagnetic field 112 propagates from a transmitting antenna 110(2) to a receiving antenna 110(1), or vice versa, depending which antenna is configured as transmitting. The receiving antenna 110(2) together with internally interconnected load 142(2) thereof, absorbs por-tions of electromagnetic field 112 not absorbed by wireless devices 120.

Electronics

As shown in FIG. 1, both transmitting and receiving (or loading) antennas 110(1) and 110(2) are electrically con-nected to a driver 130. The driver 130 powers one of antennas 110(1) and 110(2) to emit electromagnetic field 112 within chamber 104 while coupling the other of antennas 110(1) and 110(1) to an external load 142. The emitting antenna is also referred to herein as the "transmitting antenna" while the other antenna is also referred to herein as the "loading antenna." Any of the two antennas may assume either transmitting or loading roles provided that both anten-nas do not operate simultaneously in an identical mode, i.e., when the first antenna is in transmitting mode, the second antenna must be in loading mode. In another instance, the first antenna may be switched to loading mode under the condition that the second antenna is simultaneously switched from loading to transmitting mode.

A decision about which antenna is currently transmitting (and thus which antenna is loading) is controlled internally by the driver 130. Driver 130 includes a frequency synthesizer 132 that generates an oscillating signal 133 whose amplitude is subsequently controlled via a variable attenuator 134. The output of variable attenuator 134 drives a radio-frequency (RF) power amplifier 138 to generate a high-power drive signal 135 that, via one of RF feedlines 139(1) or 139(2), is fed to either antenna 110(1) or antenna 110(2), depending on which one of the two antennas is selected as the transmitting antenna. The remaining feedline 139(2) or 139(1) transfers captured unused power by the loading antenna 110(2) or 110(1) to external load 142(2) or 142(1). If additional gain is needed, a pre-amplifier 136 may be used to boost the output of variable attenuator 134 prior to RF power amplifier 138, as shown in FIG. 1. A distribution-and-measurement unit 140 after RF power amplifier 138 directs the high-power drive signal 135 to the transmitting antenna, routes the unused power signal that is captured by the loading antenna to external load 142, and performs measurements of the transmitted and reflected fractions of the power signal 135.

Figure 5:
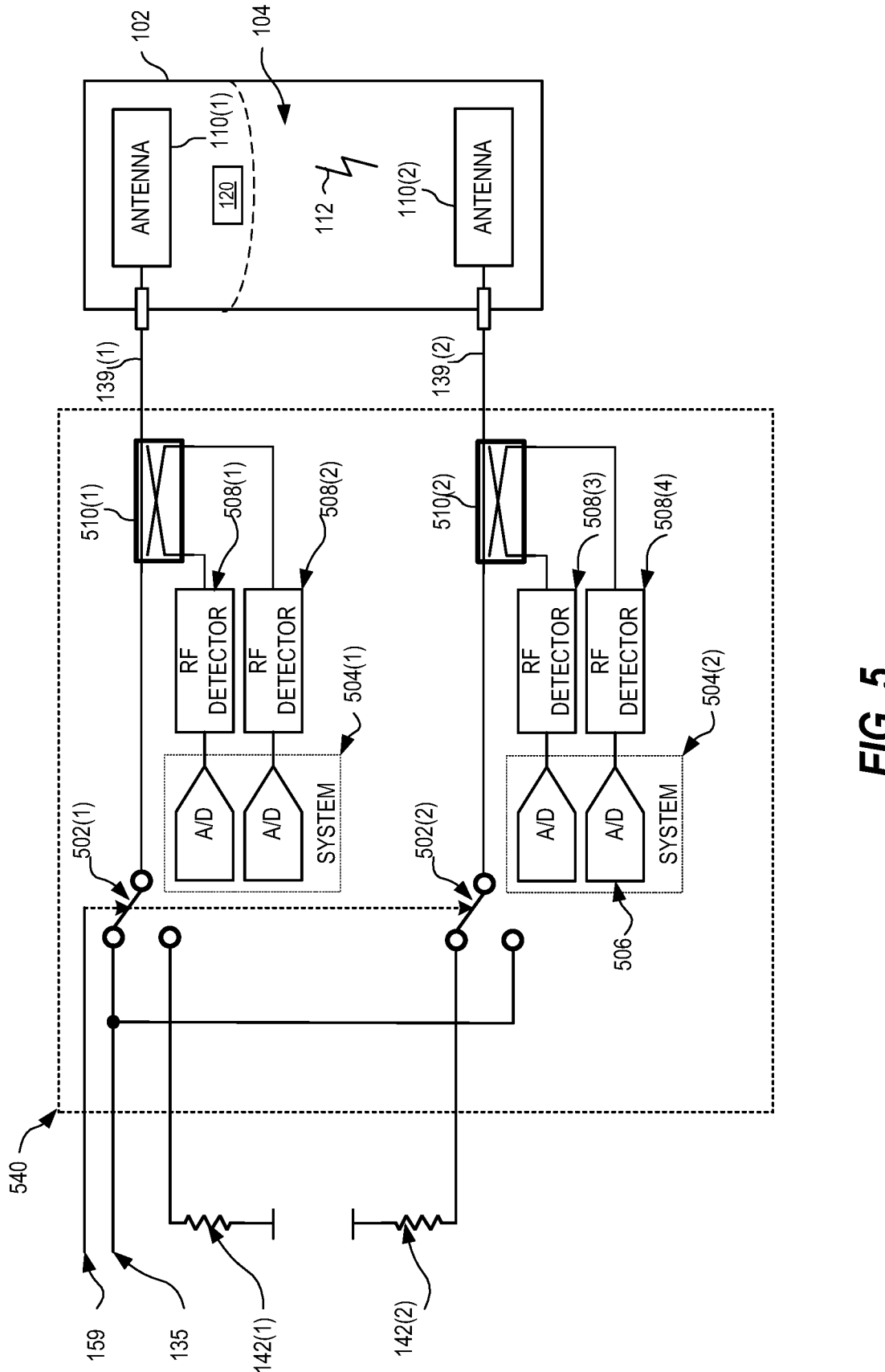
FIG. 5 is a schematic diagram of the distribution and measurement unit of FIG. 1, in an embodiment.

An example of the distribution-and-measurement unit 140 is shown as unit 540 in FIG. 5. In this embodiment, a digital or bi-state analog input switching mode control signal 159 that originates from controller 170 causes a change of positions of two two-pole single-throw switches 502(1) and 502(2). The signal 159 is a binary type, i.e., when its value is below a maximum low threshold value (commonly referred as logic low or low), both switches 502(1) and 502(2) flip to or remain in low position. On the other hand, when the signal 159 is above a minimum high threshold value (commonly referred as logic high or high), both switches 502 flip their position to high. The minimum high threshold is above the maximum low threshold value with a separation level dependent on the switch technology used. For 3.3-volt logic level, then the maximum low threshold level is approximately 0.8 V, while the minimum high threshold level is approximately 2.0 V. A switch 502 may be a two-position mechanical switch, a BJT transistor, a MOSFET transistor, an IGBT transistor, or another type of a semiconductor component or circuit without departing from the scope thereof. In the embodiment the switching mode control signal is a TTL logic binomial voltage signal ±5 V. In some embodiments it may be a binary signal of a different voltage levels such as ±2.5 V, ±10 V or other values. In other embodiments, this signal may be in a form of two level electric current signal or binomial intensity optical signal without departing from the scope herein. The switching mode control signal 159 simultaneously flips position of both switches 502 either high or low.

When the switching mode control signal 159 is high, both switches 502 are in the high position as shown in FIG. 5. In this case, the high-power drive signal 135 is coupled through switch 502(1), a first directional coupler 510(1), and via RF feedline 139(1) to antenna 110(1). The antenna 110(1) in this case is the transmitting antenna that emits electromagnetic field 112 toward wireless devices 120 and antenna 110(2) located at the opposite end of the chamber 104. The unused part of the emitted energy by the wireless devices is captured by the loading antenna 110(2) and subsequently passed through a second RF feedline 139(2), a second directional coupler 510(2) and switch 502(2) to be eventually dissipated in load resistor 142(2). When the control signal 159 is low, the switches 502(1) and 502(2) are in low positions. For this situation, the high power drive signal 135 passes through switch 502(2), directional coupler 510(2) and RF feed line 139(2) to antenna 110(2) that in this case becomes the transmitting antenna emitting electromagnetic field 112 in the upward direction. The opposite end antenna 110(1), assuming a role of load antenna here, captures the unused transmitted charging energy and after passing through RF feedline 139(1), directional coupler 510(1) and switch 502(1) dissipates it in external load resistor 142(1).

The directional couplers 510(1) and 510(2) are used to measure or sample a forward (or incident) and reflected portions of high-power drive signal power as well as a forward and reflected portions of unused charging power that is captured by the loading antenna to be dissipated in an external load. When the switches 502(1) and 502(2) are in the high position, the high-power drive signal 135 flows through the top directional coupler 510(1). Voltage signals proportional to a forward portion and a reflected portion of the high-power drive signal 135 are available at the sensing terminals of 510(1). These sensing voltages are picked up by identical RF detectors 508(1) and 508(2). Analog-to-digital (A/D) converters 504 convert the voltages of the forward and reflected portions of the high-power drive signal 135 voltages to digital format representations to be further processed by the controller 170.

While the switches 502 are in the high position, detection and measurement of both a forward and a reflected portion of the unused power (captured by the loading antenna) is processed similarly to that of the high-power drive signal 135. Once the forward and reflected portions of the high-power drive signal 135 have been measured, a first standing wave ratio (SWR) can be computed (e.g., by the controller 170). The first SWR quantifies how well the impedance of the antenna 110(2) matches that of the RF feedline 139(2). Similarly, a second SWR can be measured for the antenna 110(1) to indicate how well the impedance of the external load 142(1) matches that of the RF feedline 139(1). Additionally, since the bi-directional couplers 510(1) and 510(2) can discriminate signals travelling in either direction, the unused RF energy directed to the load can be measured.

After calculating the SWR, the controller 170 may use the SWR for safety purposes. For example, the controller 170 may disable the RF power amplifier 138 when the SWR exceeds a threshold. In this case, disabling the RF power amplifier 138 may prevent a large reflection of the drive signal 135 from damaging the RF power amplifier 138. A large SWR may arise, for example, when there is an object in the chamber 104 that does not belong (e.g., a piece of metal) and should not be exposed to electromagnetic fields. A large SWR may also arise when the chamber 104 is not fully closed (e.g., the door 106 is still partially open). In this case, disabling the RF power amplifier 138 prevents electromagnetic radiation from leaving the chamber 104. The controller 170 may alternatively or additionally disable a different component of the wireless charging system 100 without departing from the scope hereof. The controller 170 may also display an indication to a user (e.g., a light) that the wireless charging system 100 is disabled. Such an indication allows the user to investigate and remedy the source of the high SWR.

The chamber 104 is a closed system. Since the incident charging RF power and the RF power that is not absorbed by the tags and not dissipated in the walls and other lossy parts of the medium can be measured, the RF power absorbed by the devices 120 being charged can be calculated as follows:

$$P_{incident} = P_{reflected} + P_{system} + P_{devices} + P_{load} \qquad (6)$$

In addition, the available measurements of incident, reflected and unabsorbed power levels could yield an estimate of the total charging system efficiency for various grouping and spatial arrangements of wireless devices 120 loaded into the tank.

Transmitting antenna 110 may be any type of transducer that, when driven with an electric current (e.g., high-power drive signal 135), emits an electromagnetic field for coupling into chamber 104 (e.g., for exciting the $TE_{10}$ transverse mode of chamber 104). For example, transmitting antenna 110 may be a rod or loop, wherein one or more of its geometry, material, and proximities to inner surfaces 105 of chamber 104 is selected such that transmitting antenna 110 has an impedance matching that of RF feedline 139. In another example, transmitting antenna 110 is a radiating element, and inner surface 105 of bottom end 108 is electrically grounded to form a counterpoise for the radiating element. In this case, a longitudinal distance between the radiating element and bottom end 108 is selected such that the combination has an electrical impedance of $50\Omega$. In certain embodiments, the longitudinal distance between the radiating element and bottom end 108 is adjustable to create the electrical impedance of $50\Omega$. With this impedance, RF feedline 139 can be a conventional $50\Omega$ coaxial cable that connects to transmitting antenna 110 without a tuner, and RF power amplifier 138 can be an amplifier with a $50\Omega$ output impedance.

Driver 130 includes a controller 170 that may represent a computing device physically separate from, but in electronic communication with, housing 102 (e.g., a laptop computer, tablet computer, smartphone, or other such mobile device). Alternatively, controller 170, or any portion thereof, may be implemented as an embedded system physically incorporated with housing 102. In certain embodiments, controller 170 may represent one or more of a microprocessor, microcontroller, field-programmable gate array (FPGA), system-on-chip (SoC), application-specific integrated circuit (ASIC), Programmable Logic Controller (PLC) or another such circuit or chip capable of processing machine-readable instructions. Controller 170 may include, or connect with, a user interface 180 and may include networking capability to provide input to, and display output from, controller 170. Controller 170 may include at least one processor 172 communicatively coupled with memory 174 storing firmware 176 (e.g., software) that includes machine-readable instructions that, when executed by processor 172, control processor 172 to operate wireless charging system 100 as described herein.

Wireless charging system 100 may also include a sense antenna 150 that is positioned within chamber 104 near middle of the chamber 104. Sense antenna 150 senses electromagnetic field 112 within chamber 104 and sends a signal to a balanced-impedance signal splitter 152 that outputs: (i) a first split signal 154 to a detector 156, and (ii) a second split signal 158 to a transceiver 162 via a high-pass filter (HPF) 160. In certain embodiments, detector 156 uses first split signal 154 to determine a state of electromagnetic field 112 within chamber 104. For example, detector 156 may determine one or both of a presence of electromagnetic field 112 within chamber 104, and a strength (e.g., power or amplitude) of electromagnetic field 112 within chamber 104.

In one example of operation, a user places at least one wireless device 120 within chamber 104 and closes door 106. The user may then instruct controller 170, via user interface 180, to start charging the at least one wireless device 120. Firmware 176 controls processor 172 to operate one or more of frequency synthesizer 132, variable attenuator 134, pre-amplifier 136, RF power amplifier 138, switches 502 position to drive selected transmitting antenna 110(1) or 110(2) to generate electromagnetic field 112 within chamber 104. Controller 170 receives feedback 164 from detector 156 indicating a status of electromagnetic field 112 within chamber 104, and one or more signals from distribution-and-measurement unit 140 including incident and reflected portions of high-power drive signal 135 and that of the unused power captured by the loading antenna in RF feedlines 139.

Sense antenna 150 may also receive one or more wireless messages from operational circuit 220 of wireless device 120 within chamber 104 (see wireless message 121 in FIG. 1), wherein second split signal 158 is inputted to transceiver 162. HPF 160 blocks electrical signals, at the frequency f of electromagnetic field 112, that are picked up by sense antenna 150. Transceiver 162 may decode second split signal 158 to receive each wireless message and determine, for example, a status of wireless device 120.

In one example of operation, each wireless device 120 periodically transmits a wireless message 121 that includes: (1) a device identifier (ID) that uniquely identifies the wireless device 120, and (2) an indication of a battery level of battery 210 of the wireless device 120. The indication of the energy level may be, for example, a percentage of a maximum capacity of battery 210, or a measured voltage of battery 210.

In another example of operation, each wireless device 120 transmits a status message (e.g., wireless message 121) only in response to an interrogation signal 151 transmitted by controller 170 via sense antenna 150. For example, firmware 176 may, at intervals, pause transmission of electromagnetic signal 112 (e.g., by disabling RF power amplifier 138), control transceiver 162 to transmit interrogation signal 151 via sense antenna 150, and receive, via sense antenna 150 and in response to interrogation signal 151, at least one wireless message 121 from any one or more wireless devices 120 within chamber 104. In certain embodiments, interrogation signal 151 may include one device ID such that only one wireless device 120 with a matching device ID responds to interrogation signal 151. In this way, controller 170 may control transceiver 162 to transmit a plurality of interrogation signals 151, one for each wireless device 120 in chamber 104, at different times so that transceiver 162 receives the corresponding wireless messages 121 without collisions. In certain embodiments, where all wireless devices 120 respond to one interrogation signal 151, wireless devices 120 implement a collision-avoidance technique (e.g., back-off timers) to ensure that the resulting plurality of wireless messages 121 are transmitted at different times, and thus without collisions. After receiving wireless messages 121, firmware 176 may then resume transmission of electromagnetic signal 112 within chamber 104 (e.g., by enabling RF power amplifier 138) to continue charging of wireless devices 120.

When RF power amplifier 138 is disabled, firmware 176 may additionally transmit one or more messages to reprogram or configure any one or more of wireless devices 120 within chamber 104. For example, a wireless device 120 may measure and store telemetry data during normal operation. Firmware 176 may transmit a message instructing wireless device 120 to upload the telemetry data (e.g., as wireless message 121 to transceiver 162 via sense antenna 150). Advantageously, reprogramming, configuring, and uploading of data takes advantage of wireless devices 120 being conveniently located in one place for charging. For example, controller 170 may communicate (e.g., via a computer network) with a tracking computer (not shown) that uses wireless devices 120. In this example, controller

170 may receive, from the tracking computer, programming information for each wireless device 120.

More generally, the chamber 104 acts as a Faraday shield that prevents wireless communications within the chamber 104 (e.g., between wireless devices 120 and the sense antenna 150, or between wireless devices 120) from leaving the chamber 104. These wireless communications are secure since an antenna located outside of the chamber 104 cannot communicate with any wireless device 120 located inside of the chamber 104. Thus, Faraday shielding allows sensitive information stored in the wireless devices 120 (e.g., audio data, biotelemetry, personal identifying information, personal health information, etc.) to be wirelessly downloaded without an eavesdropper being able to wirelessly access the sensitive information (e.g., via a sniffing or snooping attack). Faraday shielding similarly allows sensitive information (e.g., firmware upgrades) to be wirelessly transmitted to the wireless devices 120, again without an eavesdropper being able to wirelessly access such information.

Figure 6:
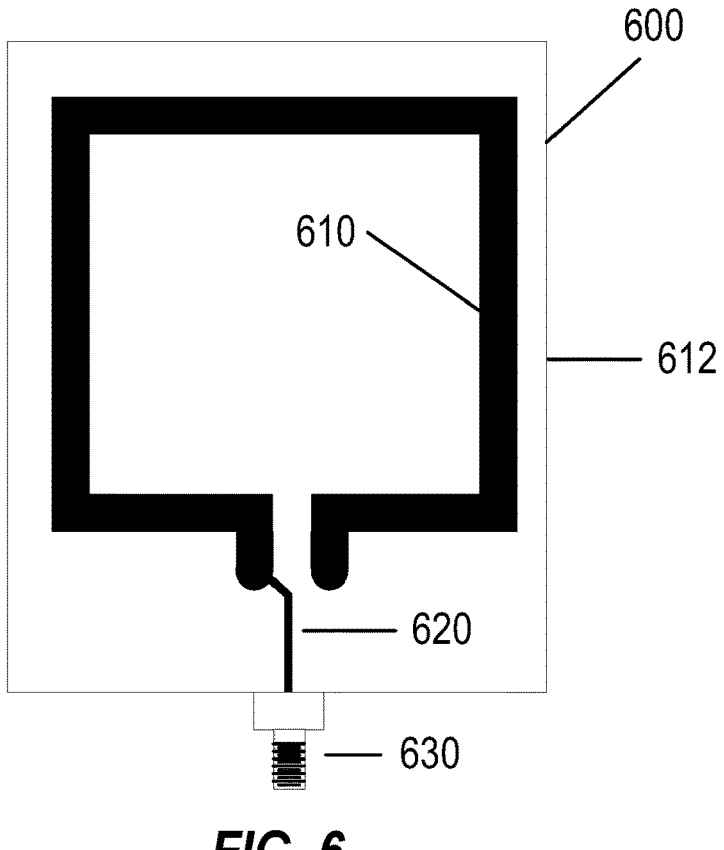
FIG. 6 shows a printed circuit antenna.
Figure 7:
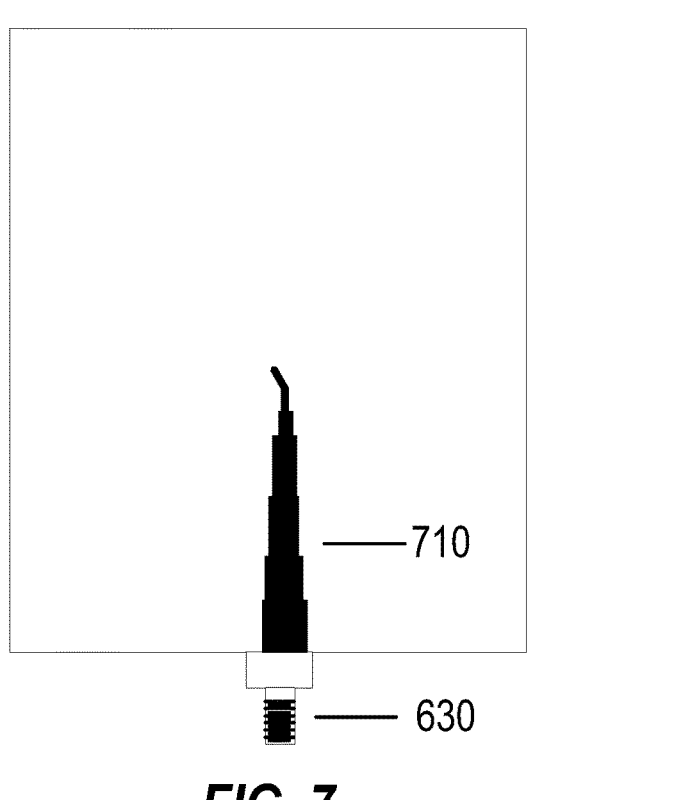
FIG. 7 shows a balun on the ground side of the printed circuit antenna of FIG. 6.

FIG. 6 shows a printed circuit antenna 600 having a conductive rectangle 610 deposited on a first side of a circuit board 612. Conductive rectangle 610 is sized and shaped to operate at a resonant frequency and bandwidth. Antenna 600 is connected to an RF connector 630 via a strip line 620. FIG. 7 shows the second side of the circuit board 612. Located on the second side is a tapered balun 710 that is used to match the impedance of antenna 600 to a connecting circuit. In FIG. 6, antenna 600 is shaped as a square loop. In this case, antenna 600 acts like a magnetic loop coupler. However, antenna 600 may be sized or shaped differently than shown in FIG. 6 without departing from the scope hereof. For example, antenna 600 may be a planar monopole or patch antenna.

Each of the antennas 110(1) and 110(2) shown in FIG. 1 may be the printed circuit antenna 600 of FIGS. 6 and 7. Advantageously, the design of the antenna 600 can be easily changed on a computer and then computationally modeled (e.g., using electromagnetic simulation software), thereby speeding up the selection of design parameters (e.g., trace width, thickness, and length) and optimization of performance metrics (e.g., coupling efficiency, bandwidth, electrical impedance, etc.). Although not shown in FIGS. 6 and 7, the circuit board 612 may also form one or more holes, each sized and located for securing a standoff to the circuit board 612. These standoffs may have a common length such that the circuit board 612, when installed inside the chamber 104 using the standoffs, is parallel to the inner surface 105 of the bottom end 108 and displaced from the inner surface 105 by the common length. This common length is another parameter to be selected as part of the design of the antenna 600.

Figure 8:
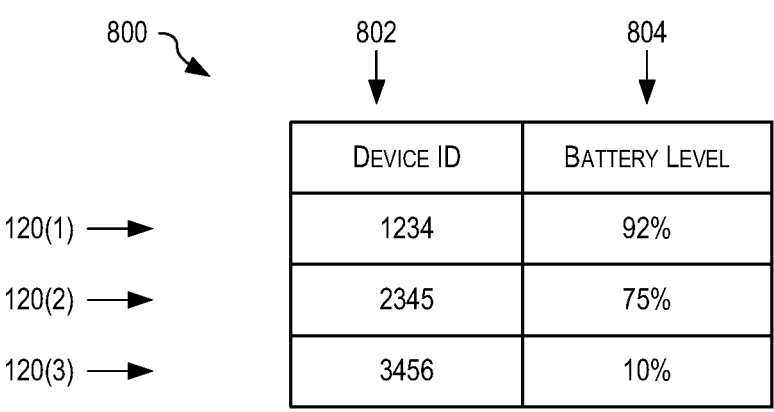
FIG. 8 shows a charge-status table used to track charging of wireless devices, in an embodiment.

FIG. 8 shows one example of a charge-status table 800 used to track charging of wireless devices 120. Charge-status table 800 has a plurality of rows, each storing one device ID 802 that uniquely identifies one corresponding wireless device 120 detected within chamber 104. Each row also stores a battery level 804 of battery 210 of the corresponding one wireless device 120. In FIG. 8, the battery level 804 is a percentage of a maximum capacity. Firmware 176 stores charge-status table 800 in memory 174 of controller 170 and generates and updates charge-status table 800 based on wireless messages 121 received from wireless devices 120. A number of rows of charge-status table 800 may equal a number of wireless devices 120 detected within chamber 104. In the example of FIG. 8, charge-status table 800 has three rows storing three device IDs (i.e., 1234, 2345, and 3456) corresponding to first, second, and third wireless devices 120(1), 120(2), and 120(3), respectively, detected within chamber 104. Prior to charging, firmware 176 may communicate with wireless devices 120 (e.g., via wireless messages 121) to obtain initial values of battery levels 804. During subsequent charging, firmware 176 may, at intervals, pause charging to communicate with wireless devices 120 and update battery levels 804, as described above.

In certain embodiments, firmware 176 instructs processor 172 to display, and update in real-time, charge-status table 800 on user interface 180. In these embodiments, each row of charge-status table 800 may be displayed based on its corresponding battery level 804. For example, when a battery level 804 exceeds a threshold, the corresponding row may be displayed in a color (e.g., green) indicating that the corresponding wireless device 120 is nearly fully charged. If the battery level 804 does not exceed the threshold, the corresponding row is displayed in a different color (e.g., yellow) indicating that the corresponding wireless device 120 is not fully charged. In another example, when a battery level 804 surpasses the threshold, the corresponding row of charge-status table 800 is removed from user interface 180 such that only wireless devices 120 that are not fully charged are displayed.

Figure 9:
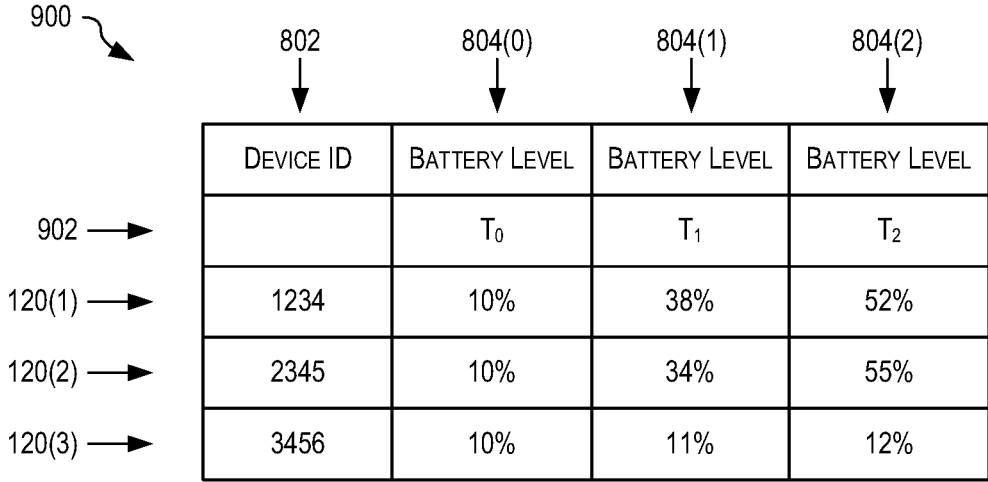
FIG. 9 shows a charge-status table that tracks battery levels over time to determine a charging rate for each wireless device, in an embodiment.

FIG. 9 shows one example of a charge-status table 900 that tracks battery levels 804 over time to determine a charging rate for each wireless device 120. Charge-status table 900 is similar to charge-status table 800 of FIG. 8 except that charge-status table 900 stores a plurality of battery levels 804 for each wireless device 120, each of the battery levels 804 being obtained at a different time 902. For example, charge-status table 900 includes a column of initial battery levels 804(0) obtained from wireless devices 120 at an initial time $T_0$, a column of first battery levels 804(1) obtained from wireless devices 120 at a first time $T_1$, and a column of second battery levels 804(2) obtained from wireless devices 120 at a second time $T_2$. For each wireless device 120, firmware 176 may determine a linearly-approximated charging rate by dividing a difference in battery levels by a difference in corresponding times. Thus, for first wireless device 120(1), the charging rate between times $T_0$ and $T_1$ is approximately $(38\%-10\%)/(T_1-T_0)$, and the charging rate between times $T_1$ and $T_2$ is approximately $(52\%-38\%)/(T_2-T_1)$. Charging rates for second wireless device 120(2) and third wireless device 120(3) may be calculated similarly. Although charge-status table 900 only shows three columns of battery levels 604 obtained at three corresponding times 902, charge-status table 900 may have any number of columns of battery levels 804 obtained at the same number of corresponding times 902. Alternatively, charge-status table 900 may only have a fixed number of n columns, wherein battery levels for each wireless device 120 are stored cyclically across the n columns such that only the most recently n battery levels of each wireless device 120 are stored in charge-status table 900.

Based on the determined charging rates, firmware 176 may determine whether a corresponding wireless device 120 is charging efficiently. In the example of FIG. 9, the battery level for third wireless device 120(3) only changes by 1% between times $T_0$ and $T_1$, and between times $T_1$ and $T_2$, and thus third wireless device 120(3) does not appear to be charging as fast as first and second wireless devices 120(1) and 120(2). In this case, firmware 176 may instruct processor 172 to display a message via user interface 180 indicating that third wireless device 120(3) is not charging properly and should be investigated. For example, charge-status table 900 may be displayed on user interface 180 with only the most-recent battery levels. Each wireless device 120 that is identified as not charging properly may be displayed in a color (e.g., red) that differentiates these wireless devices 120 from those that are charging properly (e.g., yellow) and those that are fully charges (e.g., green).

In some embodiments, firmware 176 instructs controller 170 to change a power or amplitude of electromagnetic field 112 based on a number of wireless devices 120 within chamber 104. The number of wireless devices 120 may be determined, for example, from a number of rows of charge-status table 800. When the number of wireless devices 120 is low (e.g., five or less), controller 170 may communicate with variable attenuator 134 to increase attenuation of oscillating signal 133, thereby reducing the power of high-power drive signal 135. Alternatively, when the number of wireless devices 120 is high (e.g., fifty or more), controller 170 may communicate with variable attenuator 134 to decrease attenuation of oscillating signal 133, thereby increasing the power of high-power drive signal 135 (assuming that RF power amplifier 138 is not saturated). Controller 170 may additionally or alternatively vary which antenna is transmitting or its duty cycle when switching from transmit to receive.

In certain embodiments, chamber 104 includes a mechanical, electrically non-conductive structure that, under control of firmware 176, moves wireless devices 120 within chamber 104 to ensure that each receives a similar amount of energy from electromagnetic field 112. For example, chamber 104 may include a plastic platter (e.g., basket, net, etc.) on which wireless devices are placed, and that is one or more of rotated, raised, and lowered. The structure may be occasionally or periodically controlled to move certain wireless devices 120 closer to "hot spots" in the chamber 104 that have a higher energy flux density, and therefore at which the wireless devices 120 will charge faster. After wireless devices 120 in such hot spots are fully charged, the structure may be controlled to move other wireless devices 120 closer to the hot spots, and to move fully-charged wireless devices 120 away from these hot spots.

In other embodiments, each wireless device 120 is physically movable, under its own control, within the chamber 104. For example, a wireless device 120 may be attached to a drone or other type of vehicle. The wireless device 120 may also be electrically connected to the drone so that it can control the drone to move inside the chamber 104. In this manner, the drone and wireless device 120 cooperate as an autonomous vehicle that can move itself to a hot spot when the battery level of the wireless device 120 is low (see chargeable battery 210 in FIG. 2). Similarly, this autonomous vehicle can move away from the hot spot when the battery is fully charged, thereby allowing another wireless device 120 to move into the hot spot. Since there may be several drones in the chamber 104, each flying autonomously under the control of a wireless device 120 physically attached thereto, each drone may be equipped with one or more sensors that the attached wireless device 120 uses to avoid collisions with other drones. Swarm intelligence techniques may be used to avoid collisions. Swarm intelligence techniques may also be used to ensure that the autonomous vehicles are spatially distributed throughout the chamber 104 such that each wireless device 120 has an opportunity to charge rapidly in a hot spot.

In some embodiments, more than one wireless device 120 is physically attached to each drone. In one of these embodiments, only one of the wireless devices 120 attached to each drone controls said each drone. In another of these embodiments, more than one of the wireless devices 120 attached to each drone cooperate to control said each drone.

In certain embodiments, wireless charging system 100 may include multiple transmitting antennas 110 positioned at a different angle or spacing to each other within chamber 104. In one embodiment, multiple antennas 110 are multiplexed, wherein firmware 176 selectively drives one of antennas 110 based on feedback from wireless device 120 within chamber 104. In another embodiment, antennas 110 are simultaneously driven with different phases to implement a phased array.

RF power amplifier 138 may be either a linear amplifier (e.g., class A) or a high-efficiency switchmode amplifier (e.g., class D). In the latter case, the output (i.e., the power of high-power drive signal 135) may be controlled by adjusting a duty cycle of the amplifier, either in addition to or instead of variable attenuator 134.

In certain embodiments, firmware 176 monitors the SWR of high-power drive signal 135 and instructs controller 170 to shut down RF power amplifier 138 if reflections from transmitting antenna 110 are high enough to damage RF power amplifier 138. Such high-power reflections may indicate improper operation of wireless charging system 100, such as wireless devices 120 that are located too close to transmitting antenna 110, improper grounding of bottom end face 108, improper connection of RF feedline 139, metallic objects located inside chamber 104, movement of transmitting antenna 110, or door 106 not being fully closed. Firmware 176 may additionally control processor 172 to indicate, via user interface 180, that the SWR is too high, and that housing 102 should be investigated.

Wavelength, Frequency, and Chamber Size

One factor that may be taken into consideration when designing wireless charging system 100 is that transverse dimensions of chamber 104 (e.g., one or both of first side length 412 and second side length 416) are related to the wavelength λ and frequency f of electromagnetic field 112 according to a dispersion equation. For a hollow rectangular waveguide with a first transverse dimension a (e.g., first side length 412) that is greater than a second transverse dimension b (e.g., second side length 416), the dispersion equation is $$f^2 = \left(f_{10}^{(c)}\right)^2 + \frac{c^2}{\lambda^2} = \frac{c^2}{4a^2 + \lambda^2}, \tag{7}$$

where $$f_{10}^{(c)} = c/(2a)$$

is a cutoff frequency for the lowest-frequency $TE_{10}$ mode, and c is the speed of light. From Eqn. 7, the frequency f is less than its free-space value of c/λ, and the wavelength λ is greater than its free-space value of c/f. Note that the wavelength λ is sometimes referred to as the "guide wavelength" to distinguish it from the free-space wavelength.

A volume of chamber 104 (e.g., any one or more of first transverse length 412, second transverse length 416, and height 414) may be selected to accommodate one or more wireless devices 120, one or more objects within which one or more wireless devices 120 are embedded, or a combination thereof. One of both of the transverse dimensions of chamber 104, as based on the selected volume, may then be used with the dispersion equation (i.e., Eqn. 7) to determine an appropriate frequency f, and frequency synthesizer 132 may be set accordingly. Alternatively, a desired frequency f may first be selected, which may then be used with the dispersion equation to determine the wavelength $\lambda$, the transverse dimensions of chamber 104, and thus the volume of chamber 104.

The frequency f must be greater than the cutoff frequency $$f_{10}^{(c)}$$

for the lowest-frequency $TE_{10}$ mode to excite. However, if the frequency f is too large, then a second-lowest-frequency mode will excite, resulting in multimode operation that changes the energy flux density from the mathematical form of Eqn. 4. Specifically, if b<a/2, the second-lowest-frequency mode is the $TE_{02}$ mode, whose cutoff frequency $$f_{20}^{(c)}$$

is twice that of the $TE_{01}$ mode, i.e., $$f_{20}^{(c)} = 2 f_{10}^{(c)}.$$

However, if b>a/2, then the second-lowest-frequency mode is the transverse-magnetic $TM_{01}$ mode whose cutoff frequency is $$f_{01}^{(c)} = c/2b.$$

As b approaches a, $$f_{01}^{(c)}$$

approaches $$f_{10}^{(c)}$$

and the single-mode bandwidth $\Delta f$, or range of frequencies f over which the waveguide will operate only in the $TE_{01}$ mode, decreases. Thus, to ensure a sufficiently large single-mode bandwidth $\Delta f$, it may be desirable for chamber 104 to have a rectangular cross section (e.g., second side length 416 is less than first side length 412), as opposed to the square cross section shown in FIG. 4.

Once the transverse dimensions of chamber 104 are determined, a longitudinal dimension L (e.g., height 414) of chamber 104 may be then determined to prevent excitation of longitudinal modes that could result in a non-uniform energy flux density within chamber 104. A longitudinal mode is excited when the longitudinal dimension L equals an integer multiple of $\lambda/2$. The lowest-frequency longitudinal mode thus has a frequency of 2c/L. As the frequency f approaches the critical frequency $$f_{10}^{(c)},$$

the wavelength $\lambda$ grows according to $$\lambda = \frac{c}{\sqrt{f^2 - (f_{10}^{(c)})^2}}. \tag{8}$$

Thus, by selecting the frequency f close to $$f_{10}^{(c)},$$

the wavelength $\lambda$ can be made large, and the longitudinal dimension L can be increased while still preventing excitation of the lowest-frequency longitudinal mode at $\lambda/2$. However, as the frequency f approaches the critical frequency $$f_{10}^{(c)},$$

losses due to the finite electrical conductivity of inner surfaces 105 increases. Mathematically, the wave impedance $\eta_{TE}$ depends on the frequency f according to:

$$\eta_{TE} = \frac{\eta}{\sqrt{1 - (f_{10}^{(c)}/f)^2}}, \tag{9}$$

where $\eta$ is the wave impedance is free space (e.g., approximately $377\Omega$ if chamber 104 is filled with air or vacuum). Thus, the Poynting vector $P_z$ of Eqn. 4 can be written more generally as $$P_Z = \frac{1}{\eta}|E_0|^2 \sqrt{1 - (f_{10}^{(c)}/f)^2} \, \sin^2\left(\frac{\pi x}{a}\right), \tag{10}$$

which shows that the energy flux density goes to zero as f approaches $$f_{10}^{(c)}.$$

Thus, as shown by Eqns. 8-10, the choice of frequency f within the single-mode bandwidth $\Delta f$ gives rise to a trade-off between the amount of transmitted power and excitation of a longitudinal mode.

Another factor that may be taken into consideration when designing wireless charging system 100 is an operational frequency of operational circuit 220. If the frequency f of electromagnetic field 112 were to coincide with the operational frequency, or a harmonic thereof, operational circuit 220 could be damaged by power received by wireless device 120. Accordingly, the frequency f may be selected to avoid the operational frequency and its harmonics.

As an example of the above considerations, assume that operational circuit 220 of wireless device 120 includes a transceiver and antenna operating at 6.5 GHz. Selecting, for example, transverse dimensions of a=0.4 m and b=0.35 m yields $$f_{10}^{(c)} = c/2a = 375 \text{ MHz.}$$

single-mode bandwidth $\Delta f$ extends from $$f_{10}^{(c)}$$

up to c/2b=428.5 MHz (i.e., the cut-off frequency $$f_{10}^{(c)}$$

of the $TM_{10}$ mode). All values of f within the single-mode bandwidth $\Delta f$ are significantly far from the operational frequency of 6.5 GHz to limit damage to operational circuit 220.

In the previous example, consider f=400 MHz, which lies near the center of the single-mode bandwidth $\Delta f$. For this value of f, the wavelength $\lambda$, as determined by Eqn. 8, is 2.15 m, from which a longitudinal distance L of, for example, 70 cm may be selected. From Eqn. 10, power transmission is reduced by a factor of $$\left(1 - \left(f_{10}^{(c)}/f\right)^2\right)^{1/2} = 0.35,$$

as compared to the theoretical infinite-frequency limit (i.e., where the square-root term of Eqn. 10 equals 1). Increasing f to 425 MHz decreases $\lambda$ to 1.5 m and increases power transmission to 0.47 of the infinite-frequency limit. Alternatively, decreasing f to 380 MHz increases $\lambda$ to 4.9 m and decreases power transmission to 0.16 of the infinite-frequency limit.

The above discussion assumes that electromagnetic field 112 propagates as a steady-state excitation throughout chamber 104. However, when the longitudinal dimension L of chamber 104 is less than $\lambda/2$, electromagnetic field 112 may not reach its steady state prior to reaching the end of the waveguide. In this case, the Poynting vector will likely be more complicated than that of Eqn. 10. For instance, transmitting antenna 110 may excite higher-order modes of the waveguide, but with a frequency f below their cutoff frequencies. In this case, these higher-order excitations are not "guided" and will be attenuated exponentially with longitudinal distance. However, some of the energy in these non-guided, higher-order excitations may reach and couple into wireless devices 120.

Another factor that may be taken into consideration when designing, and especially when operating, wireless charging system 100 is how the presence of wireless devices 120 inside chamber 104 affects its operation. Wireless devices 120, including objects within which one or more wireless devices 120 are embedded, act as dielectric materials whose presence in chamber 104 affects the cutoff frequencies, wavelength $\lambda$ (e.g., Eqn. 8), wave impedance (e.g., Eqn. 9), Poynting vector (e.g., Eqn. 10), and other physical quantities. Each wireless device may be represented by a complex dielectric constant whose imaginary component represents absorption of power from chamber 104, and thus can be modeled as a mechanism by which power is lost from chamber 104. All these physical quantities may further depend on the specific locations of wireless devices 120 within chamber 104, and thus operation of wireless charging system 100 may vary from one cycle (i.e., charging a first batch of wireless devices 120) to a second cycle (i.e., charging a second batch of wireless devices 120). To some extent, changes to how wireless charging system 100 operates between cycles can be compensated for by varying the frequency f.

When wireless devices 120 are located in chamber 104 sufficiently far from transmitting antenna 110, wireless devices 120 will not appreciably interact with the near field emitted by transmitting antenna 110. In this case, wireless devices 120, regardless of their number in chamber 104, do not affect the reactive energy stored in the near field, and therefore negligibly impact the antenna impedance of transmitting antenna 110. For example, at f=400 MHz, the minimal distance to transmitting antenna 110 is approximately a few centimeters. Thus, most of the volume of chamber 104 is in the far-field region of transmitting antenna 110.

As the number of wireless devices 120 within chamber 104 increases, so does the amount of power absorbed from electromagnetic field 112. At a certain point, the number of wireless devices 120 within chamber 104 may be large enough that chamber 104 no longer acts like a waveguide. In this case, transmitting antenna 110 may be operated at a higher power if RF power amplifier 138 is capable of outputting this higher power. Alternatively, the number of wireless devices 120 within chamber 104 may be reduced.

In some embodiments, wireless charging system 100 operates with multiple electromagnetic fields 112 of different frequencies. For example, transmitting antenna 110 may be a broadband antenna that is electrically driven with multiple frequencies simultaneously. Alternatively, transmitting antenna 110 may be a resonant structure driven at two or more harmonics simultaneously. Alternatively, the chamber 104 includes more than one transmitting antenna 110, each generating an electromagnetic field 112 at a different frequency. In any case, each wireless device 120 may have more than one antenna (e.g., whisker antenna 206), each sized to resonate at one of the different frequencies. Thus, in these embodiments, wireless charging system 100 can simultaneously charge wireless devices 120 with different types of antennas.

Method Embodiments

The two symmetrically disposed antennas inside of chamber 104 are configured such that one antenna transmits the charging power delivered to the wireless devices 120 while the other antenna loads the unused charging power in external load 142. The duration of each antenna's role (e.g., duty cycle) is software driven to adjust spatial distribution of transferred charging power and to eliminate or reduce charging power "cold spots" in the chamber 104.

Figure 10:
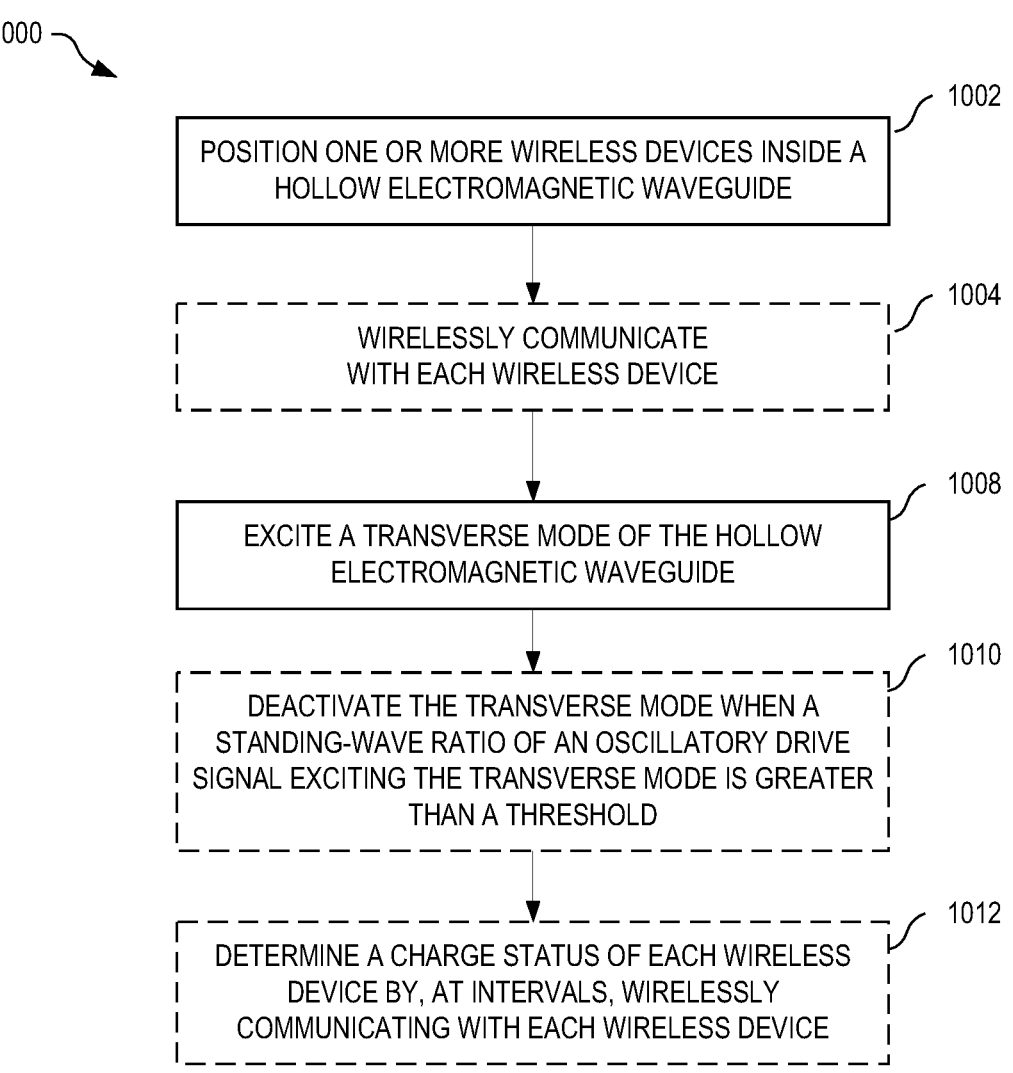
FIG. 10 a flowchart illustrating a method for wirelessly charging the wireless device of FIG. 2, in embodiments.

FIG. 10 is a flowchart illustrating a method 1000 for wirelessly charging wireless device 120 of FIG. 2. Method 1000 is, for example, implemented, at least in part, by firmware 176 of controller 170 within driver 130 of wireless charging system 100, and in part within wireless device 120 positioned within wireless charging system 100.

In a block 1002 of method 1000, one or more wireless devices are positioned inside a hollow electromagnetic waveguide. In one example of block 1002, one or more wireless devices 120 are placed within chamber 104 of wireless charging system 100, wherein inner-facing surfaces of chamber 104 are electrically conductive such that chamber 104 forms an electromagnetic waveguide.

In a block 1008 of method 1000, a transverse mode of the hollow electromagnetic waveguide is excited by an electromagnetic field. The hollow electromagnetic waveguide guides the electromagnetic field along the hollow electromagnetic waveguide. In one example of block 1008, driver 130 feeds transmitting antenna 110(1) with high-power drive signal 135 to emit electromagnetic field 112 into chamber 104. Antenna 110(2) is set to load. The antennas are set to alternately transmit and receive, or load, at a selected duty cycle. Each wireless device, of the one or more wireless devices, converts a portion of the guided electromagnetic field into a current for recharging a battery of said each wireless device. For example, each wireless device 120 inside chamber 104 uses one or more whisker antennas 206 to receive a portion of electromagnetic field 112 as an AC current for charging battery 210.

In certain embodiments, method 1000 includes a block 1004 in which an identity of each wireless device, of the one or more wireless devices, is determined by wirelessly communicating with each wireless device. In one example of block 1004, controller 170 receives, via sense antenna 150 and from each of wireless device 120 within chamber 104, message 121 that includes a corresponding device ID. Within each message 121, each wireless device 120 may additionally communicate an initial battery level.

In certain embodiments, method 1000 includes a block 1010 in which the transverse mode is deactivated when the SWR of an oscillatory drive signal exciting the transverse mode is greater than a threshold. In one example of block 1010, the controller 170 calculates the SWR of high-power drive signal 135 driving RF feedline 139 and shuts down RF power amplifier 138 when reflections from transmitting antenna 110 are high enough to damage RF power amplifier 138.

In certain embodiments, method 1000 includes a block 1012 in which a charge status of each wireless device is determined by, at intervals, wirelessly communicating with each wireless device. In one example of block 1012, firmware 176 may, at intervals, pause transmission of electromagnetic signal 112 (e.g., by disabling RF power amplifier 138), control transceiver 162 to transmit interrogation signal 151 via sense antenna 150, and receive, via sense antenna 150 and in response to interrogation signal 151, at least one wireless message 121 indicating a charge status of chargeable battery 210 from any one or more wireless devices 120 within chamber 104.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A wireless charging system comprising:
a hollow electromagnetic waveguide;
a platform that, when placed inside the hollow electromagnetic waveguide, positions at least one wireless device to absorb energy from an electromagnetic field propagating along the hollow electromagnetic waveguide;
a first waveguide coupler positioned inside the hollow electromagnetic waveguide and near a first end of the hollow electromagnetic waveguide; and a second waveguide coupler positioned inside the hollow electromagnetic waveguide and near a second end of the hollow electromagnetic waveguide that is opposite to the first end;
wherein:
the first waveguide coupler, when driven with an electrical driving signal, couples energy from the electrical driving signal into the electromagnetic field; and
the second waveguide coupler, when the first waveguide coupler is driven with the electrical driving signal, couples energy from the electromagnetic field into an electrical receiving signal.

2. The wireless charging system of claim 1, each of the first and second waveguide couplers being a magnetic loop coupler.

3. The wireless charging system of claim 1, each of the first and second waveguide couplers being a probe coupler.

4. The wireless charging system of claim 1, the second waveguide coupler being electrically connected to a dissipative load.

5. The wireless charging system of claim 1, further comprising switches operable to (i) connect one of the first and second waveguide couplers to a power amplifier and (ii) connect the other of the first and second waveguide couplers to a dissipative load.

6. The wireless charging system of claim 1, the hollow electromagnetic waveguide having inner surfaces that are electrically conductive.

7. The wireless charging system of claim 1, each of the first and second waveguide couplers comprising metal on a circuit board.

8. The wireless charging system of claim 1, the platform being shaped to position the at least one wireless device away from the first and second waveguide couplers to reduce coupling with a near field generated by each of the first and second waveguide couplers.

9. The wireless charging system of claim 1, further comprising a sense antenna located inside the hollow electromagnetic waveguide.

10. The wireless charging system of claim 1, the hollow electromagnetic waveguide having transverse dimensions such that the electromagnetic field excites only a transverse electric $TE_{10}$ mode of the hollow electromagnetic waveguide.

11. A wireless charging method, comprising:
positioning at least one wireless device on the platform of the wireless charging system of claim 1;
driving the first waveguide coupler of the wireless charging system to generate an electromagnetic field that propagates along the hollow electromagnetic waveguide of the wireless charging system;
converting, by each of the at least one wireless device, energy of the electromagnetic field into electrical energy; and
coupling, with the second waveguide coupler of the wireless charging system, energy from the electromagnetic field into an electrical receiving signal.

12. The wireless charging method of claim 11, further comprising dissipating energy of the electrical receiving signal in a dissipative load.

13. The wireless charging method of claim 11, wherein said driving the first waveguide coupler includes feeding an electrical driving signal from a power amplifier into the first waveguide coupler.

14. The wireless charging method of claim 13, further comprising switching between:

the first waveguide coupler being electrically connected to the power amplifier and the second waveguide coupler being electrically connected to a dissipative load; and the second waveguide coupler being electrically connected to the power amplifier and the first waveguide coupler being electrically connected to the dissipative load.

15. The wireless charging method of claim 13, further comprising:

monitoring a standing-wave ratio of the electrical driving signal; and disabling the power amplifier when the standing-wave ratio exceeds a threshold.

16. The wireless charging method of claim 11, further comprising wirelessly communicating with each of the at least one wireless device to determine an identity of said each of the at least one wireless device.

17. The wireless charging method of claim 11, further comprising:

pausing said driving;

transmitting, during said pausing, an interrogation signal to the at least one wireless device;

receiving, from the at least one wireless device and in response to said transmitting, a status message indicating a battery charge level of the at least one wireless device; and resuming said driving if the battery charge level is below a threshold.

18. The wireless charging method of claim 11, wherein said driving the first waveguide includes exciting one or more modes of the hollow electromagnetic waveguide.

19. The wireless charging method of claim 18, wherein said exciting includes exciting only one transverse electric $TE_{10}$ mode of the hollow electromagnetic waveguide.

20. The wireless charging method of claim 18, wherein said exciting includes overmoding the hollow electromagnetic waveguide.

21. A wireless charging system comprising:

a plurality of hollow electromagnetic waveguides that intersect to form an intersection region;

a platform that, when placed inside the intersection region, positions at least one wireless device to absorb energy from a plurality of electromagnetic fields propagating along the plurality of hollow electromagnetic waveguides, respectively; and for each hollow electromagnetic waveguide of the plurality of hollow electromagnetic waveguides:

a first waveguide coupler positioned inside said each hollow electromagnetic waveguide and near a first end of said each hollow electromagnetic waveguide; and a second waveguide coupler positioned inside said hollow electromagnetic waveguide and near a second end of said each hollow electromagnetic waveguide that is opposite to the first end;

wherein:

the first waveguide coupler of said each hollow electromagnetic waveguide, when driven with an electrical driving signal, couples energy from the electrical driving signal into a respective one of the plurality of electromagnetic fields; and the second waveguide coupler of said each hollow electromagnetic waveguide, when the first waveguide coupler of said each hollow electromagnetic waveguide is driven with the electrical driving signal, couples energy from the respective one of the plurality of electromagnetic fields into an electrical receiving signal.

* * * * *